United States Patent
Phelan-Tran

(10) Patent No.: US 9,921,722 B2
(45) Date of Patent: Mar. 20, 2018

(54) PAGE TRANSITION SYSTEM AND METHOD FOR ALTERNATE GESTURE MODE AND INVOCATION THEREOF

(71) Applicant: Rakuten Kobo, Inc., Toronto (CA)

(72) Inventor: Chelsea Phelan-Tran, Ajax (CA)

(73) Assignee: Rakuten Kobo, Inc., Toronto (CA)

( * ) Notice: Subject to any disclaimer, the term of this patent is extended or adjusted under 35 U.S.C. 154(b) by 302 days.

(21) Appl. No.: 14/528,689

(22) Filed: Oct. 30, 2014

(65) Prior Publication Data
US 2016/0124594 A1    May 5, 2016

(51) Int. Cl.
| | | |
|---|---|---|
| G06F 3/041 | (2006.01) |
| G06F 3/0483 | (2013.01) |
| G06F 3/0488 | (2013.01) |
| G06K 9/00 | (2006.01) |
| G06F 15/02 | (2006.01) |

(52) U.S. Cl.
CPC .......... *G06F 3/0483* (2013.01); *G06F 3/0416* (2013.01); *G06F 3/04883* (2013.01); *G06F 3/04886* (2013.01); *G06F 15/0291* (2013.01); *G06K 9/00335* (2013.01); *G06F 2203/04808* (2013.01)

(58) Field of Classification Search
None
See application file for complete search history.

(56) References Cited

U.S. PATENT DOCUMENTS

| 6,788,292 B1 | 9/2004 | Nako et al. |
| 2001/0024195 A1* | 9/2001 | Hayakawa .......... G06F 3/04847 345/173 |

(Continued)

FOREIGN PATENT DOCUMENTS

| JP | 11-242539 A | 9/1999 |
| JP | 2011-216043 A | 10/2011 |

(Continued)

OTHER PUBLICATIONS

International Search Report and Written Opinion dated Dec. 22, 2015 in PCT/JP2015/005475 (English Translation only).
AAA Android Apps, Linux 100%, vol. 17, May 1, 2012, 4 pages.

*Primary Examiner* — Ilana Spar
*Assistant Examiner* — Kirk Hermann
(74) *Attorney, Agent, or Firm* — Oblon, McClelland, Maier & Neustadt, L.L.P.

(57) ABSTRACT

A method and system for providing an alternate gesture interface. A computing device, such as an electronic personal display or e-reading device, includes a memory and a display screen having touch functionality. The memory stores instructions configured to enact a page transition operation for digital content rendered on the display screen upon receipt of a first gesture input action performed at a first portion of the display screen. The method comprises receiving a gesture-mode switch request; in response to the gesture-mode switch request, disabling the touch functionality of the display screen; activating the touch functionality in only a second portion of the display screen, the second portion being at least partly spatially exclusive of the first portion of the display screen; and enacting the page transition operation only when a predefined second gesture input action is received at the second portion of the display screen.

21 Claims, 4 Drawing Sheets

(56) References Cited

U.S. PATENT DOCUMENTS

| | | | |
|---|---|---|---|
| 2004/0212602 A1 | 10/2004 | Nako et al. | |
| 2010/0175018 A1* | 7/2010 | Petschnigg | G06F 3/0483 715/776 |
| 2011/0050591 A1* | 3/2011 | Kim | G06F 3/0488 345/173 |
| 2011/0247067 A1 | 10/2011 | Hirose | |
| 2012/0038571 A1* | 2/2012 | Susani | G06F 3/0416 345/173 |
| 2013/0300696 A1* | 11/2013 | Haran | G06F 3/041 345/173 |
| 2014/0240242 A1* | 8/2014 | Kawalkar | G06F 3/0418 345/173 |
| 2014/0380247 A1* | 12/2014 | Tecarro | G06F 3/0483 715/863 |
| 2015/0091860 A1* | 4/2015 | Shih | G06F 3/0418 345/174 |

FOREIGN PATENT DOCUMENTS

| | | |
|---|---|---|
| JP | 2013-164652 A | 8/2013 |
| JP | 2015-158758 A | 9/2015 |

\* cited by examiner

PAGE TRANSITION SYSTEM AND METHOD FOR ALTERNATE GESTURE MODE AND INVOCATION THEREOF

TECHNICAL FIELD

Examples described herein relate to a system and method for invoking an alternate gesture mode on a display screen pertaining to digital reading of content displayed thereon.

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, Kobo Aura H2O and the like).

Some electronic personal display devices are purpose built devices designed to perform especially well at displaying digitally-stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal displays are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION

Figure 1:
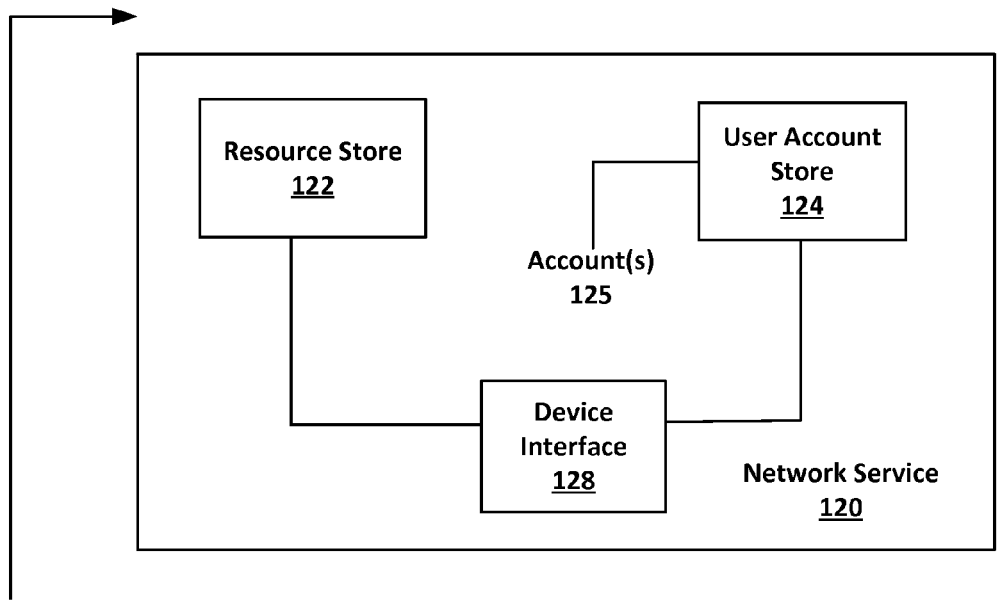
FIG. 1 illustrates a system utilizing applications and providing e-book services on a computing device configured for transitioning to an alternate gesture mode of operation, according to an embodiment.
Figure 1:
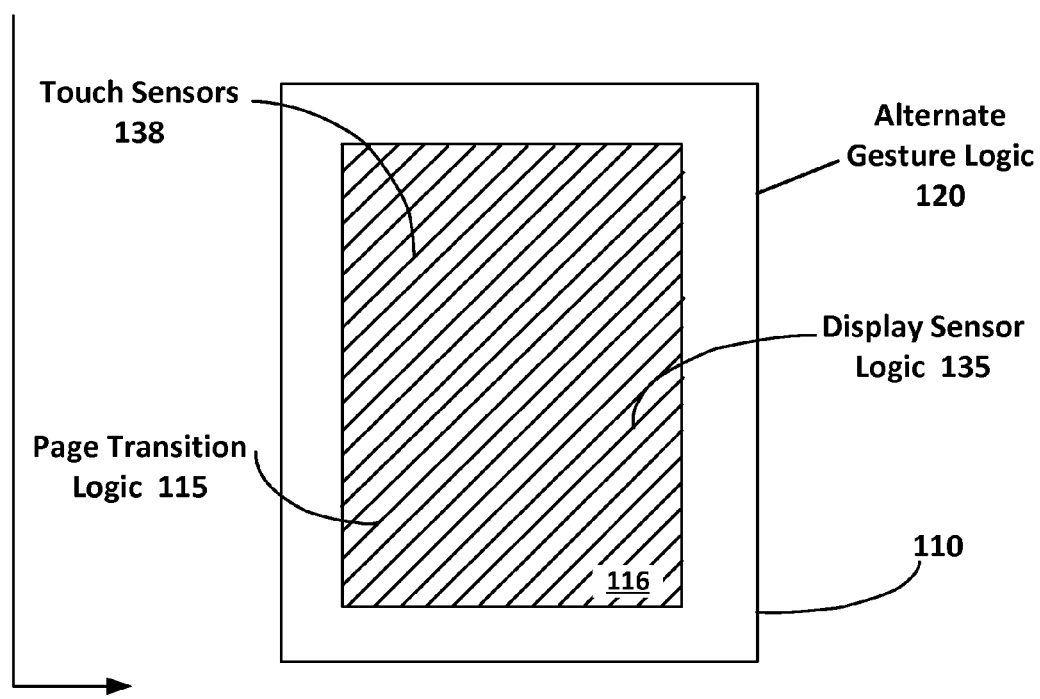

Embodiments described herein provide for a computing device that is operable via an alternate gesture interface mode, wherein the alternate gesture action is made more complex by requiring a higher degree of human motor skills co-ordination for enactment upon the touch-sensitive display screen of the electronic personal display or e-reading device (in one embodiment), and thus rendered less prone to inadvertent, false or otherwise undesirable triggering of input commands, as compared with normal operation.

One or more embodiments described herein may be implemented using programmatic modules or components. A programmatic module or component may include a program, a subroutine, a portion of a program, or a software or a hardware component capable of performing one or more stated tasks or functions in conjunction with one or more processors. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be stored on a computer-readable non-transitory medium. In particular, the numerous computing and communication devices shown with embodiments of the invention include processor(s) and various forms of computer memory, including volatile and non-volatile forms, storing data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices and magnetic memory. Computers, terminals, network enabled devices (e.g., mobile devices such as cell phones and wearable computers) are all examples of machines and devices that utilize processors, memory, and instructions stored on computer-readable mediums. Additionally, embodiments may be implemented in the form of computer-programs, or a computer usable storage medium capable of storing such a program.

"E-books" are a form of electronic publication content stored in digital format in a computer non-transitory memory, viewable on a computing device having display functionality, An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., specialized c-reading application software) to view e-books in a format that mimics the paginated printed publication. Still further, some devices (sometimes labeled as "e-readers")

can display digitally-stored content in a more reading-centric manner, while also providing, via a user input interface, the ability to manipulate that content for viewing, such as via discrete successive pages.

An "e-reading device", also referred to herein as an electronic personal display, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultra-mobile computing device, or a wearable computing device with a form factor of a wearable accessory device (e.g., smart watch or bracelet, glasswear integrated with a computing device, etc.). As another example, an e-reading device can include an c-reader device, such as a purpose-built device that is optimized for an e-reading experience (e.g., with E-ink displays).

FIG. 1 illustrates a system 100 for utilizing applications and providing e-book services on a computing device, according to an embodiment. In an example of FIG. 1, system 100 includes an electronic personal display device, shown by way of example as an e-reading device 110, and a network service 121. The network service 121 can include multiple servers and other computing resources that provide various services in connection with one or more applications that are installed on the e-reading device 110. By way of example, in one implementation, the network service 121 can provide e-book services that communicate with the e-reading device 110. The e-book services provided through network service 121 can, for example, include services in which e-books are sold, shared, downloaded and/or stored. More generally, the network service 121 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to the network service 121 and enables e-books provided through the service to be viewed and consumed. In another implementation, the e-reading device 110 can run a media playback or streaming application that receives files or streaming data from the network service 121. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 121 can include a device interface 128, a resource store 122 and a user account store 124. The user account store 124 can associate the e-reading device 110 with a user and with an account 125. The account 125 can also be associated with one or more application resources (e.g., e-books), which can be stored in the resource store 122. The device interface 128 can handle requests from the e-reading device 110, and further interface the requests of the device with services and functionality of the network service 121. The device interface 128 can utilize information provided with a user account 125 in order to enable services, such as purchasing downloads or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e,g., e-books) that are purchased or otherwise made available to the user of the e-reading device 110, as well as to archive e-books and other digital content items that have been purchased for the user account 125, but are not stored on the particular computing device.

With reference to an example of FIG. 1, e-reading device 110 can include a display screen 116 and a housing 118. In an embodiment, the display screen 116 is touch-sensitive, to process touch inputs including gestures (e.g., swipes). For example, the display screen 116 may be integrated with one or more touch sensors 138 to provide a touch-sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116. Additionally, the housing 118 can also be integrated with touch sensors to provide one or more touch sensing regions, for example, on the bezel and/or back surface of the housing 118.

In some embodiments, the e-reading device 110 includes features for providing functionality related to displaying paginated content. The e-reading device 110 can include page transitioning logic 115, which enables the user to transition through paginated content. The e-reading device 110 can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch sensing region of the display screen 116. For example, the user may swipe the surface of the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state. For example, a user can touch and hold the surface of the display screen 116 in order to cause a cluster or chapter page state transition, while a tap in the same region can effect a single page state transition (e.g., from one page to the next in sequence). In another example, a user can specify page turns of different kinds or magnitudes through single taps, sequenced taps or patterned taps on the touch sensing region of the display screen 116.

According to some embodiments, the e-reading device 110 includes display sensor logic 135 to detect and interpret user input or user input commands made through interaction with the touch sensors 138. By way of example, the display sensor logic 135 can detect a user making contact with the touch-sensing region of the display screen 116. More specifically, the display sensor logic 135 can detect taps, an initial tap held in sustained contact or proximity with display screen 116 (otherwise known as a "long press"), multiple taps performed either sequentially or generally simultaneously, swiping gesture actions made through user interaction with the touch sensing region of the display screen 116, or any combination of these gesture actions. Furthermore, the display sensor logic 135 can interpret such interactions in a variety of ways. For example, each interaction may be interpreted as a particular type of user input corresponding with a change in state of the display 116.

In one implementation, the display sensor logic 135 implements operations to monitor for the user contacting a surface of the display 116 coinciding with a placement of one or more touch sensor components 138 and also detects and correlates a particular gesture (e.g., pinching, swiping, tapping, etc.) as a particular type of input or user action. Display sensor logic 135 may also sense directionality of a user gesture action so as to distinguish between, for example, leftward, rightward, upward, downward and diagonal swipes for the purpose of associating respective input commands therewith.

Alternate gesture logic module 120 can be implemented as a software module comprising instructions stored in a memory of mobile computing device 110, as described in further detail below with regard to FIG. 2.

Figure 2:
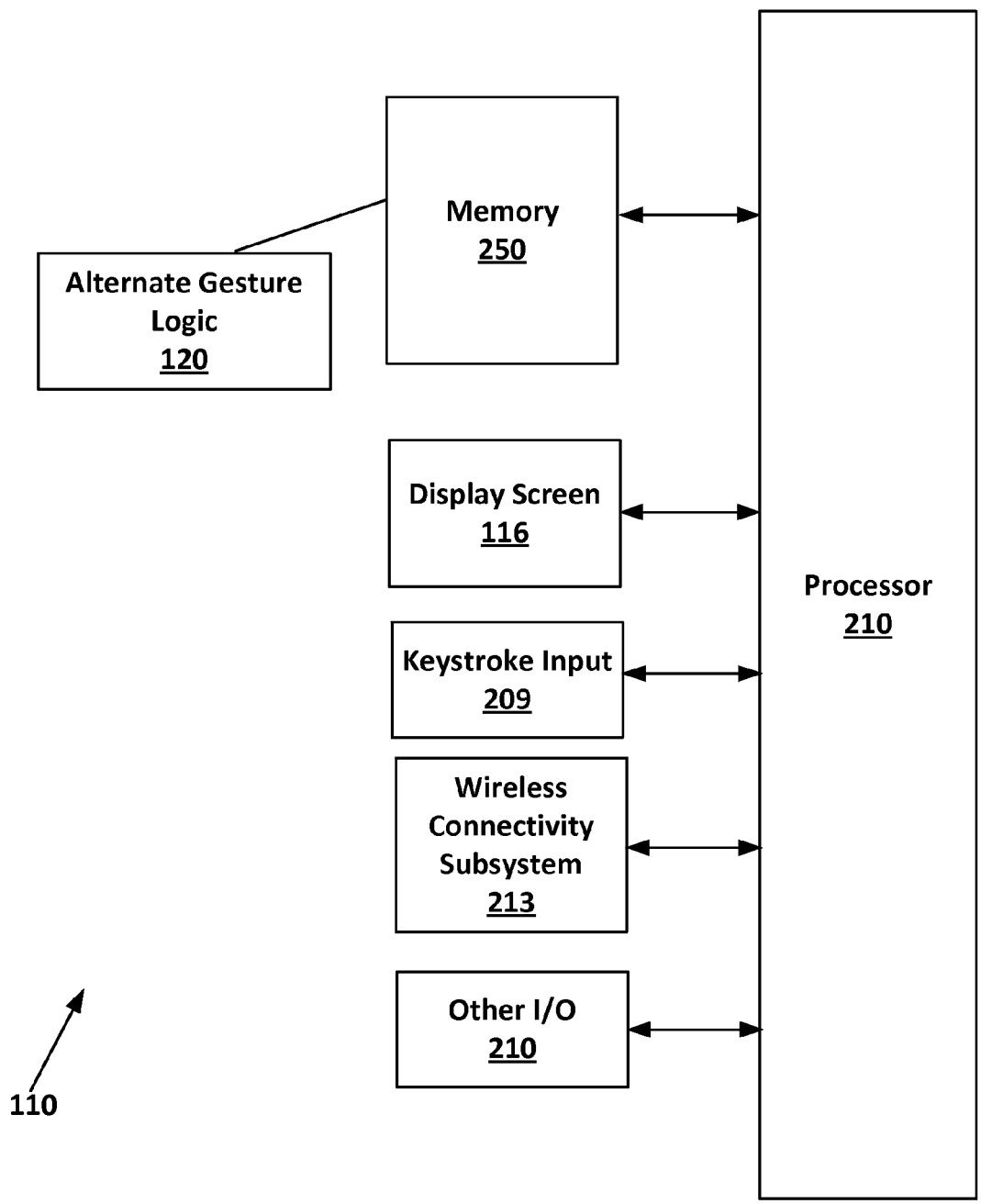
FIG. 2 illustrates an example architecture configuration of a computing device for transitioning to the alternate gesture mode of operation, according to an embodiment.

FIG. 2 illustrates further detail of e-reading device 110 as described above with respect to FIG. 1, in an embodiment architecture. E-reading device 110 further includes processor 210, a memory 250 storing instructions and logic pertaining at least to display sensor logic 135 and alternate gesture logic 114.

Processor 210 can implement functionality using the logic and instructions stored in memory 250. Additionally, in some implementations, processor 210 utilizes the network interface 220 to communicate with the network service 121 (see FIG. 1). More specifically, the e-reading device 110 can access the network service 121 to receive various kinds of resources (e.g., digital content items such as e-books, configuration files, account information), as well as to provide information (e.g., user account information, service requests etc.). For example, e-reading device 110 can receive application resources 221, such as e-books or media files, that the user elects to purchase or otherwise download via the network service 121. The application resources 221 that are downloaded onto the e-reading device 110 can be stored in memory 250.

In some implementations, the display 116 can correspond to, for example, a liquid crystal display (LCD) or light emitting diode (LED) display that illuminates in order to provide content generated from processor 210. In some implementations, the display 116 can be touch-sensitive. For example, in some embodiments, one or more of the touch sensor components 138 may be integrated with the display 116. In other embodiments, the touch sensor components 138 may be provided (e.g., as a layer) above or below the display 116 such that individual touch sensor components 138 track different regions of the display 116. Further, in some variations, the display 116 can correspond to an electronic paper type display, which mimics conventional paper in the manner in which content is displayed. Examples of such display technologies include electrophoretic displays, electro-wetting displays, and electro-fluidic displays.

Processor 210 can receive input from various sources, including touch sensor components 138, display 116, keystroke input 208 such as from a virtual or rendered keyboard, and other input mechanisms 210 (e.g., buttons, mouse, microphone, etc.). With reference to examples described herein, processor 210 can respond to input detected at the touch sensor components 138. In some embodiments, processor 210 responds to inputs from the touch sensor components 138 in order to facilitate or enhance e-book activities such as generating e-book content on the display 116, performing page transitions of the displayed e-book content, powering off the device 110 and/or display 116, activating a screen saver, launching or closing an application, and/or otherwise altering a state of the display 116.

In some embodiments, memory 250 may store display sensor logic 135 that monitors for user interactions detected through the touch sensor components 138, and further processes the user interactions as a particular input or type of input. In an alternative embodiment, the display sensor logic 135 may be integrated with the touch sensor components 138. For example, the touch sensor components 138 can be provided as a modular component that includes integrated circuits or other hardware logic, and such resources can provide some or all of the display sensor logic 135. In variations, some or all of the display sensor logic 135 may be implemented with processor 210 (which utilizes instructions stored in memory 250), or with an alternative processing resource.

E-reading device 110 further includes wireless connectivity subsystem 213, comprising a wireless communication receiver, a transmitter, and associated components, such as one or more embedded or internal antenna elements, local oscillators, and a processing module such as a digital signal processor (DSP) (not shown). As will be apparent to those skilled in the field of communications, the particular design of wireless connectivity subsystem 311 depends on the communication network in which computing device 110 is intended to operate, such as in accordance with Wi-Fi, Bluetooth, Near Field Communication (NFC) communication protocols, and the like.

Alternate gesture logic 120 can be implemented as a software module, comprising instructions stored in memory, which runs on mobile computing device 110. One or more embodiments of alternate gesture logic 120 described herein may be implemented using programmatic modules or components comprising a program, a subroutine, a portion of a program, or a software or a hardware component capable of performing one or more stated tasks or functions. As used herein, such module or component can exist on a hardware component independently of other modules or components. Alternatively, a module or component can be a shared element or process of other modules, programs or machines.

Figure 3:
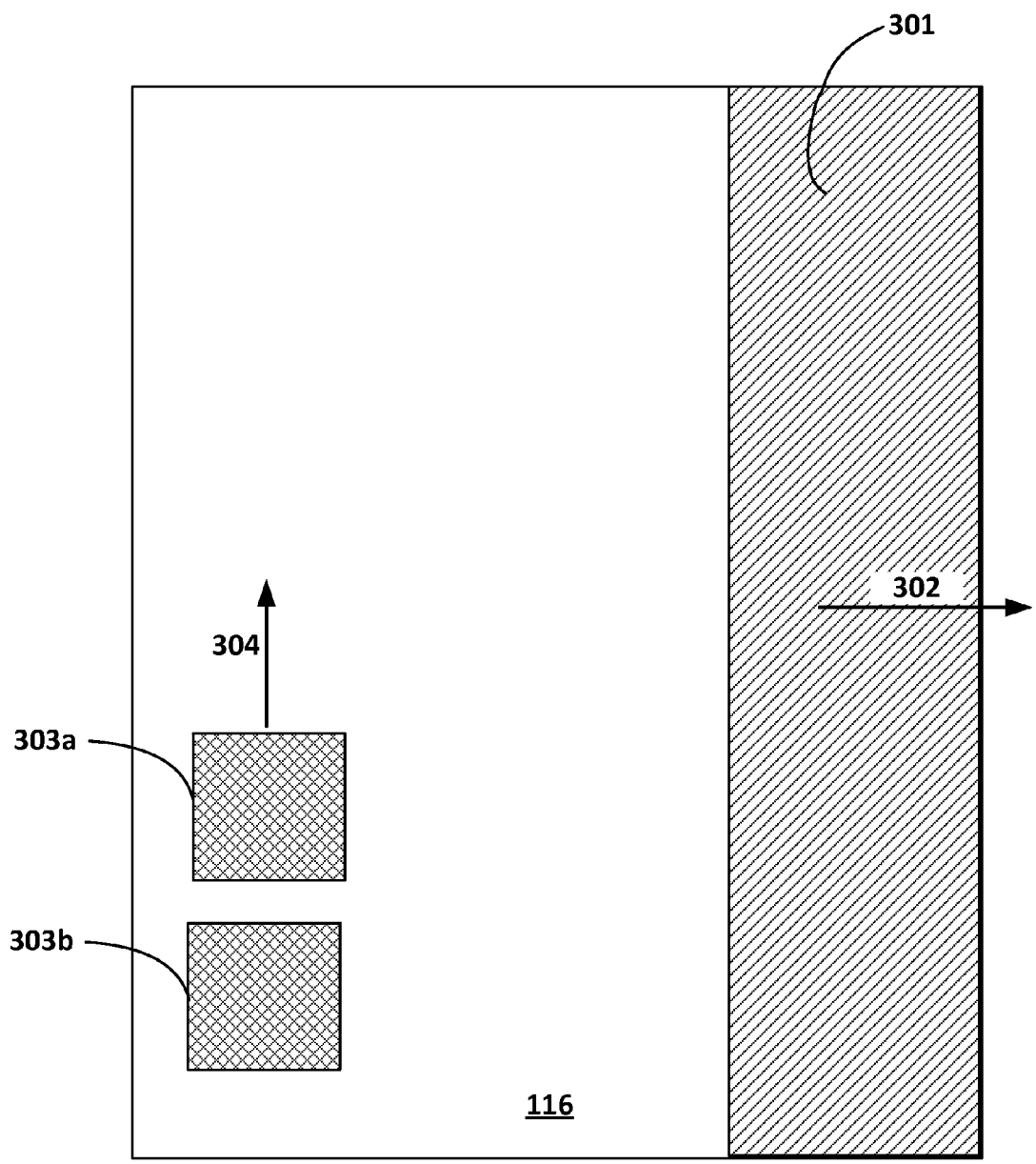
FIG. 3 illustrates an example configuration of a display screen surface in a computing device for implementing the alternate gesture mode of operation, according to an embodiment.

With reference now to FIG. 3, an embodiment implementation of alternate gesture logic 120 in operation of computing device 110 is described in further detail.

Display screen 116 of computing device 110 includes touch functionality whereby a page transition operation may be performed for digital content rendered thereon, upon receiving a gesture input action by a user. The gesture input action may comprise directionality, duration of touch, a pre-defined sequence of touches, or separate but simultaneous touches. In the embodiment depicted in FIG. 3, a swipe gesture performed in direction 302 performed at portion 301 of display screen 116 accomplishes the page transition operation. This will be referred to as operation in normal mode herein.

Upon receiving a request at computing device 110 to switch to an alternate gesture mode for input command(s), such as via a device settings menu or a drop-down menu command option, the touch functionality of the display screen 116 may be disabled, for example by interrupt-driven routines implemented via display sensor logic 135, by depriving touch sensors 138 of electrical power, or some combination thereof.

Alternate gesture logic 120 may then operate to selectively activate or re-enable the touch functionality in an alternate portion 303a or 303b of display screen 116, such as by selectively applying electrical power to only respective ones of touch sensors 138 associated with the alternate portion 303a or 303b, the latter being spatially exclusive of portion 301 of the display screen, and in one embodiment, lesser in spatial size, the intention being to present a spatial "target" for a new and alternate gesture action that would require a higher degree of human motor skills co-ordination for enactment than previously via display portion 302. Portions 303a, 303b may be contiguously located, as depicted in FIG. 3. Other ways of ensuring gesture enactment only via a more complex human motor co-ordination ability, such as an adult versus a 2-year old child, may include pre-defining, via alternate gesture logic 120, the new, alternate gesture action to be performed along a less intuitive or obtainable direction 304, requiring multiple sequential, and/or multiple simultaneous touches or taps, at distinct positions within the more spatially portions 303a, 303b of display screen 116, and even a longer duration of touch including a more sustained touch.

In another embodiment, portions 303a, 303b are geometrically shaped (e.g, circular, square, triangular) differently than portion 301 of display screen 116, with the goal of making access of the alternate gesture action more complex, in terms of motor skills required for enactment.

In this manner, alternate gesture logic 120 enacts the page transition operation, which may be a single page transition, a chapter transition or a page cluster transition, only when the more complex, predefined alternate gesture input action as described above is received at display screen 116.

Yet further, in an embodiment where the computing device comprises an electronic reading device displaying paginated content comprising an e-book at the display screen, it is contemplated that the device memory further stores instructions to enact additional commands including, but not limited to, a revert to title page of the e-book, a revert to contents page of the e-book, and a text character font size adjustment for e-book content being displayed, and all or any of these commands, in similar manner to the page transition command described herein, may subject for application of the alternate gesture scheme as described.

Figure 4:
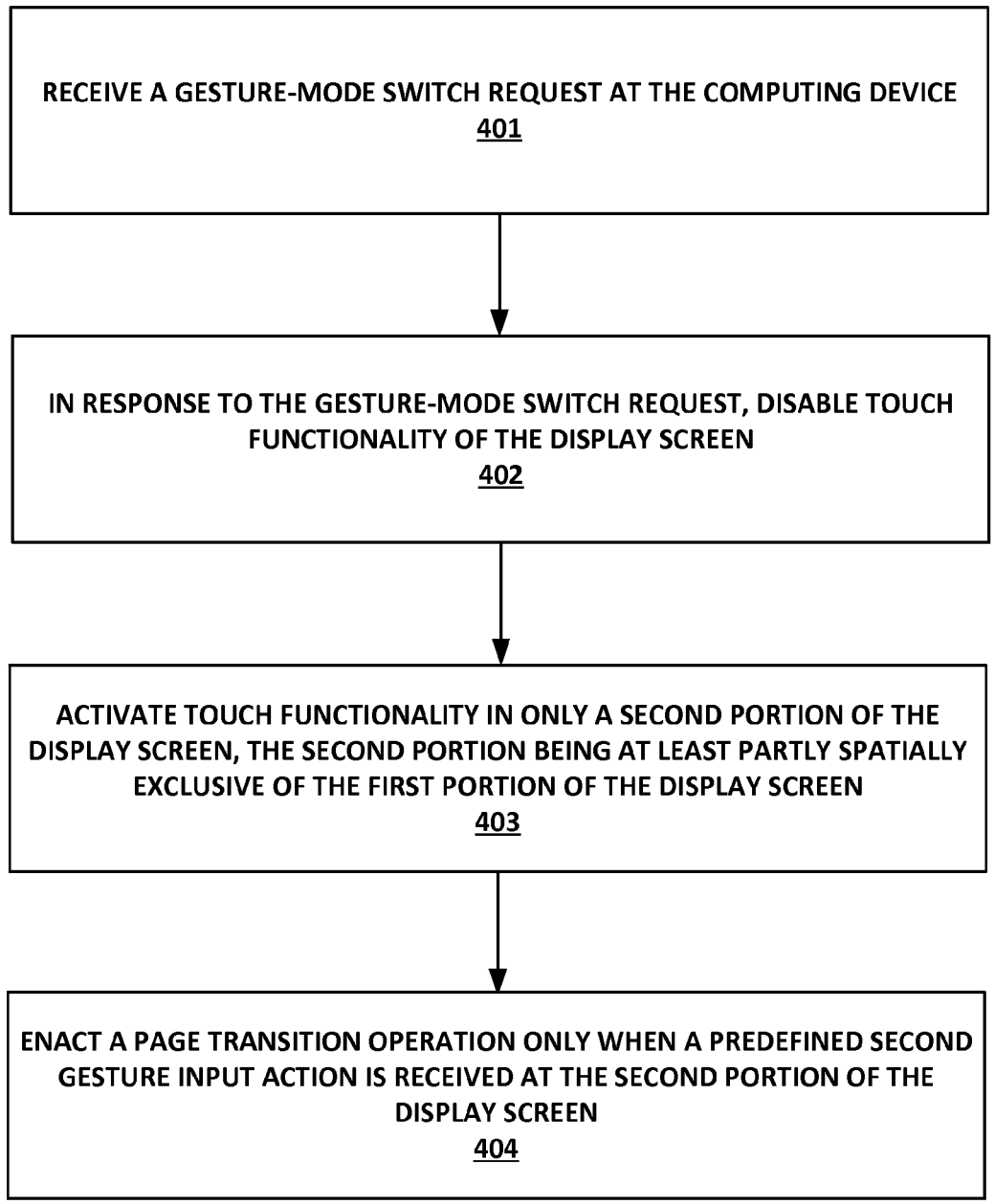
FIG. 4 illustrates a method of operating a computing device for transitioning to the alternate gesture interface mode of operation, according to an embodiment.

FIG. 4 illustrates an example method implemented by processor 210 of computing device 110 for providing an alternate gesture interface for operation, according to an embodiment using elements such as described with prior examples, including those of FIGS. 1-3.

At step 401, receiving a gesture-mode switch request at computing device 110.

At step 402, in response to the gesture-mode switch request, disabling the touch functionality of the display screen 116.

At step 403, activating the touch functionality in only a second portion of the display screen 116, the second portion 303a, 303b being at least partly spatially exclusive of a first portion 302 of the display screen.

At step 404, enacting the page transition operation only when a predefined second gesture input action is received at the second portion 303a, 303b of the display screen 116.

Yet further, the second gesture input action is different from the first gesture input action based on at least one of a directionality of motion, a duration of touch sustained, a number of sequential touches enacted at the display screen and a number of simultaneous touches enacted at the display screen.

For a parent while e-reading alongside their young child (for instance, 1-3 years old), it can be challenging to keep tiny but vigorous hands off the touch-sensitive display screen, to avoid undesirable and inadvertent triggering of interface commands, such as premature page-flipping, for instance. The method and system described herein, in one embodiment, provides parents the option, in effect, to disable the touch screen except for limited predefined section(s), whereby a limited set of commands can be implemented as compared with the normal reading mode. Where a first gesture action is performed upon a first display screen portion to accomplish a given command or task. (e.g. page-turn) in the normal mode, upon invocation of "Kids Mode", an alternate gesture, physically different form the first, must be performed upon a second display screen portion to invoke the same given command. In this manner, the alternate gesture action is made more complex by requiring a higher degree of motor skills co-ordination for enactment upon the touch-sensitive display screen of the e-reading device, and thereby much less prone to inadvertent, false or otherwise undesirable triggering of input commands by said tiny but vigorous hands and fingers.

Although illustrative embodiments have been described in detail herein with reference to the accompanying drawings, variations to specific embodiments and details are contemplated and encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method executed in a processor of a computing device, the computing device further including a memory and a display screen having touch functionality, the memory storing instructions configured to enact, in conjunction with the processor, a page transition operation for digital content rendered on the display screen upon receipt of a first gesture input action performed at a first portion of the display screen, wherein the page transition operation is associated with the first gesture input action and the first portion, the method comprising:

receiving a gesture-mode switch request;

in response to the gesture-mode switch request, disabling the touch functionality of the display screen;

activating the touch functionality in only a second portion of the display screen, the second portion being at least partly spatially exclusive of the first portion of the display screen;

associating the page transition operation with a second gesture input action and the second portion; and enacting the page transition operation only when the second gesture input action is received at the second portion of the display screen, wherein, prior to receiving the gesture-mode switch request, the page transition operation is enacted only when the first gesture input action is received at the first portion of the display screen.

2. The method of claim 1 wherein the first gesture input action is defined by at least one of: a directionality of motion, a duration of touch, and a pre-defined series of touches.

3. The method of claim 1 wherein the second portion of the display screen is spatially smaller in size than the first portion.

4. The method of claim 1 wherein the second portion is geometrically shaped differently than the first portion.

5. The method of claim 1 wherein the second portion of the display screen further comprises at least 2 contiguously located but spatially distinct portions of the display screen.

6. The method of claim 5 wherein the second gesture input action includes gesture actions performed generally simultaneously at respective ones of the spatially distinct portions comprising the second portion.

7. The method of claim 1 wherein the second gesture input action is different from the first gesture input action based on at least one of: a directionality of motion, a duration of touch sustained, a number of sequential touches enacted at the display screen and a number of simultaneous touches enacted at the display screen.

8. The method of claim 1 wherein the computing device comprises an electronic reading device displaying paginated content at the display screen.

9. The method of claim 8 wherein the memory further stores instructions to enact at least one of the following set of input commands: a revert to title page of an e-book, a revert to contents page of an e-book, and a text character font size adjustment for e-book content being displayed.

10. The method of claim 1 wherein the page transition operation is one of: a single page transition, a chapter transition and a page cluster transition.

11. The method of claim 1 wherein the touch functionality of the display screen is disabled via a menu command option.

12. A non-transitory computer-readable medium that stores instructions for providing an alternative gesture interface mode of operating a computing device, the computing device including a processor, a memory and a display screen having touch functionality, the instructions configured to enact, in conjunction with the processor, a page transition operation for digital content rendered on the display screen upon receipt of a first gesture input action performed at a first portion of the display screen, wherein the page transition operation is associated with the first gesture input action and the first portion, the instructions being executable by the processor to cause the computing device to perform operations that include:

receiving a gesture-mode switch request;

in response to the gesture-mode switch request, disabling the touch functionality of the display screen;

activating the touch functionality in only a second portion of the display screen, the second portion being at least partly spatially exclusive of the first portion of the display screen;

associating the page transition operation with a second gesture input action and the second portion; and enacting the page transition operation only when the second gesture input action is received at the second portion of the display screen, wherein, prior to receiving the gesture-mode switch request, the page transition operation is enacted only when the first gesture input action is received at the first portion of the display screen.

13. A computing device comprising:

a memory that stores a set of instructions;

a display screen having touch functionality;

a processor that accesses the instructions in memory in order to enact a page transition operation for digital content rendered on the display screen upon receipt of a first gesture input action performed at a first portion of the display screen, wherein the page transition operation is associated with the first gesture input action and the first portion, the processor being further configured to:

receive a gesture-mode switch request;

in response to the gesture-mode switch request, disable the touch functionality of the display screen;

activate the touch functionality in only a second portion of the display screen, the second portion being at least partly spatially exclusive of the first portion of the display screen;

associate the page transition operation with a second gesture input action and the second portion; and enact the page transition operation only when the second gesture input action is received at the second portion of the display screen, wherein, prior to receiving the gesture-mode switch request, the page transition operation is enacted only when the first gesture input action is received at the first portion of the display screen.

14. The computing device of claim 13, wherein the first gesture input action is defined by at least one of: a directionality of motion, a duration of touch, and a pre-defined series of touches.

15. The computing device of claim 13 wherein the page transition operation is one of: a single page transition, a chapter transition and a page cluster transition.

16. The computing device of claim 13 wherein the second portion of the display screen further comprises at least 2 contiguously located but spatially distinct portions of the display screen.

17. The computing device of claim 16 wherein the second gesture input action includes gesture actions performed generally simultaneously at respective ones of the spatially distinct portions comprising the second portion.

18. The computing device of claim 13 wherein the second gesture input action is different from the first gesture input action based on at least one of: a directionality of motion, a duration of touch sustained, a number of sequential touches enacted at the display screen and a number of simultaneous touches enacted at the display screen.

19. The computing device of claim 13 comprising an electronic reading device displaying paginated content at the display screen.

20. The computing device of claim 13 wherein the memory further stores instructions to enact at least one of the following set of input commands: a revert to title page of an e-book, a revert to contents page of an e-book, and a text character font size adjustment for e-book content being displayed.

21. The computing device of claim 13 wherein the second portion of the display screen is spatially smaller in size than the first portion.

* * * * *

UNITED STATES PATENT AND TRADEMARK OFFICE
CERTIFICATE OF CORRECTION

PATENT NO. : 9,921,722 B2  
APPLICATION NO. : 14/528689  
DATED : March 20, 2018  
INVENTOR(S) : Chelsea Phelan-Tran Page 1 of 1

It is certified that error appears in the above-identified patent and that said Letters Patent is hereby corrected as shown below:

In the Specification

Column 1, Line 64, change "according to an embodiment," to --according to an embodiment.--.

Column 2, Line 44, change "on many cell phones and consumer electronic devices and" to --on many cell phones and consumer electronic devices) and--;

Column 2, Line 56, change "functionality, An e-book can correspond to, or mimic, the" to --functionality. An e-book can correspond to, or mimic, the--; and Column 2, Line 64, change "(e.g., specialized c-reading applications software" to --e.g., specialized e-reading applications software--.

Column 3, Line 19, change "include an c-reader device" to --include an e-reader device--.

Column 4, Line 18, change "resources (e,g., e-books)" to --resources (e.g., e-books)--.

Column 7, Line 43, change "e.g, circular, square, triangular)" to --e.g., circular, square, triangular)--.

Column 8, Line 30, change "screen portion to accomplish a given command or task. (e.g." to --screen portion to accomplish a given command or task (e.g.--.

Signed and Sealed this  
Twenty-fifth Day of June, 2019

Andrei Iancu  
*Director of the United States Patent and Trademark Office*